(12) United States Patent
Kim

(10) Patent No.: US 11,173,950 B2
(45) Date of Patent: Nov. 16, 2021

(54) REDUCER OF ELECTRIC POWER-ASSISTED STEERING APPARATUS

(71) Applicant: MANDO CORPORATION, Gyeonggi-do (KR)

(72) Inventor: Jong Han Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 120 days.

(21) Appl. No.: 15/881,682

(22) Filed: Jan. 26, 2018

(65) Prior Publication Data

US 2018/0216719 A1    Aug. 2, 2018

(30) Foreign Application Priority Data

Feb. 1, 2017    (KR) .......................... 10-2017-0014340

(51) Int. Cl.
  *B62D 5/04*        (2006.01)
  *F16H 57/00*       (2012.01)
  (Continued)

(52) U.S. Cl.
  CPC ......... *B62D 5/0454* (2013.01); *B62D 5/0409* (2013.01); *F16H 57/0018* (2013.01); (Continued)

(58) Field of Classification Search
  CPC ...... F16H 55/24; B62D 5/0409; B62D 5/0454
  See application file for complete search history.

(56) References Cited

U.S. PATENT DOCUMENTS 7,883,423 B2 *   2/2011   Kubota ..................... F16D 3/68
                                                              464/73
8,505,675 B2 *   8/2013   Suzuki ................. B62D 5/0409
                                                              180/444

(Continued)

FOREIGN PATENT DOCUMENTS

CN         1723146        1/2006
CN         102770675      11/2012
(Continued)

OTHER PUBLICATIONS

Tsenov, Ventsislav, "The Main Advantages of Reinforced Rubber Sheets" Tips and Tricks How to Improve Your Product Performance, May 2, 2016, accessed Apr. 16, 2020, http://www.ira.bg/main-advantages-reinforced-rubber-sheets/. (Year: 2016).*

(Continued)

*Primary Examiner* — Joseph Brown
(74) *Attorney, Agent, or Firm* — Ladas & Parry, LLP

(57) ABSTRACT

A reducer of an electric power-assisted steering apparatus includes: a second shaft that is gear-coupled to a worm wheel by a worm disposed on an outer circumference of the second shaft and is connected to a first shaft driven by a motor through a power transfer member; a bearing coupled to an inside of a gear housing so as to support rotation of the second shaft; and a ring-shaped fixing member that is coupled to the second shaft and supported by one side of the bearing, and provides support between the second shaft and the bearing, thereby preventing the second shaft from escaping from the power transfer member.

20 Claims, 9 Drawing Sheets

(51) Int. Cl.
*F16H 57/021* (2012.01)
*F16H 57/028* (2012.01)
*F16H 57/039* (2012.01)
*F16H 57/02* (2012.01)

(52) U.S. Cl.
CPC ......... *F16H 57/021* (2013.01); *F16H 57/028* (2013.01); *F16H 57/039* (2013.01); *B62D 5/0403* (2013.01); *F16H 2057/0213* (2013.01); *F16H 2057/02034* (2013.01); *F16H 2057/02082* (2013.01)

(56) References Cited

U.S. PATENT DOCUMENTS

| | | | | |
|---|---|---|---|---|
| 8,667,858 B2* | 3/2014 | Fuechsel | ............... | B62D 5/0409 74/388 PS |
| 2007/0102228 A1* | 5/2007 | Shiina | ............... | B62D 5/0409 180/444 |
| 2013/0025960 A1* | 1/2013 | Hama | ............... | F16H 1/16 180/444 |
| 2014/0291063 A1* | 10/2014 | Kim | ............... | F16D 3/68 180/444 |
| 2014/0352467 A1* | 12/2014 | Kwon | ............... | F16H 1/26 74/400 |
| 2015/0041241 A1* | 2/2015 | Yoshikawa | ............... | F16D 3/68 180/444 |
| 2015/0298733 A1* | 10/2015 | Moriyama | ............... | B62D 5/0409 180/444 |
| 2016/0194024 A1* | 7/2016 | Kikuchi | ............... | B62D 5/0409 180/444 |
| 2016/0201761 A1* | 7/2016 | Kwon | ............... | F16C 35/063 74/425 |
| 2016/0319906 A1 | 11/2016 | Kawamura | | |
| 2017/0036691 A1* | 2/2017 | Kikuchi | ............... | F16D 11/10 |
| 2017/0058991 A1* | 3/2017 | Kim | ............... | F16D 3/12 |
| 2017/0175821 A1* | 6/2017 | Segawa | ............... | B62D 5/04 |
| 2017/0335943 A1* | 11/2017 | Ko | ............... | F16D 1/076 |
| 2019/0101164 A1* | 4/2019 | Yeom | ............... | F16D 3/12 |
| 2019/0264751 A1* | 8/2019 | Oosawa | ............... | B62D 5/0409 |

FOREIGN PATENT DOCUMENTS

| | | | | |
|---|---|---|---|---|
| CN | 103998805 | | 8/2014 | |
| CN | 104245478 | | 12/2014 | |
| CN | 105782350 | | 7/2016 | |
| CN | 106080746 | | 11/2016 | |
| EP | 2 916 021 | | 9/2015 | |
| JP | 2012131249 A | * | 7/2012 | |
| JP | 2013160241 A | * | 8/2013 | ............... F16D 3/68 |
| KR | 10-2011-0046797 | | 5/2011 | |
| WO | WO-2008093861 A1 | * | 8/2008 | ........... B62D 5/0409 |
| WO | 2016/047643 | | 3/2016 | |

OTHER PUBLICATIONS

JP 2013160241 A (Taketo Shiraishi) Aug. 19, 2013. [online] [retrieved on Dec. 1, 2020. Retrieved from: ProQuest Dialog. (Year: 2013).*
Office Action dated Mar. 9, 2020 for Chinese Patent Application No. 201810093783.0 and its English translation by Google Translate.
Office Action dated Apr. 14, 2021 for Chinese Patent Application No. 201810093783.0 and its English translation from Global Dossier.

* cited by examiner

REDUCER OF ELECTRIC POWER-ASSISTED STEERING APPARATUS

CROSS REFERENCE TO RELATED APPLICATION

This application claims priority from Korean Patent Application No. 10-2017-0014340, filed on Feb. 1, 2017, which is hereby incorporated by reference for all purposes as if fully set forth herein.

BACKGROUND OF THE INVENTION

1. Field of the Invention

The present embodiments relate to a reducer of an electric power-assisted steering apparatus and, more specifically, to a reducer of an electric power-assisted steering apparatus, wherein the reducer prevents a worm shaft from moving in an axial direction, and thus can prevent collision with peripheral components, vibration, and noise, and prevent the worm shaft from escaping from a power transfer member.

2. Description of the Prior Art

A general reducer of an electric power-assisted steering apparatus controls the driving of a motor by an electronic controller disposed in a vehicle according to a driving condition of the vehicle, and a rotational force of a worm shaft derived by the driving of the motor is added to a rotational force of a steering wheel controlled by a driver, and then is transferred to a steering shaft. Therefore, the general reducer softly and stably maintains a steering driving state of a driver.

However, in a conventional reducer of an electric power-assisted steering apparatus as described above, when a worm shaft rotates a worm wheel by a driving force of a motor, an axial load is applied to the worm shaft. Further, when the axial load is repeatedly applied, or an impact occurring due to a full turn of a steering wheel is transferred to the worm shaft, the worm shaft is moved in an axial direction and then collides with periphery components and generates vibration and noise. In severe cases, the worm shaft escapes from an inner rotor and thus cannot transfer the power of the motor.

Further, in the conventional reducer, an inner rotor and an outer rotor are coupled to each other through simple press fitting and the inner rotor is in direct contact with the inside of the outer rotor. As a result, when the reducer has been worn to a certain degree or during off-road driving, etc., a large impact may be reversely input through a steering shaft to remove the clearance and cause contact, thereby generating noise and abrasion.

SUMMARY OF THE INVENTION

The present embodiments has been derived from the aforementioned background, and an aspect of the embodiments is to provide a reducer of an electric power-assisted steering apparatus, wherein a worm shaft is completely fixed in an axial direction to prevent the worm shaft from moving in the axial direction even when an axial load is applied to the worm shaft at the time of rotation of a worm wheel by a driving force of a motor, or such an axial load is repeated, or an impact, which occurs due to a full turn of the steering wheel, is transferred to the worm shaft, so that the reducer can prevent colliding between periphery components and vibration and noise caused by the colliding and prevent the worm shaft from escaping from an inner rotor, thereby stably transferring the driving force of the motor.

In addition, an aspect of the present embodiments is to provide a reducer of an electric power-assisted steering apparatus, which can reduce noise from a clearance between an inner rotor and an outer rotor in comparison with a conventional power transfer member, and can prevent noise caused by colliding and vibration occurring when power is transferred at a portion at which a worm shaft and a motor shaft are coupled to each other.

The aspect of the present embodiments is not limited thereto, and other unmentioned aspects of the present embodiments may be clearly appreciated by those skilled in the art from the following descriptions.

The present embodiment may provide a reducer of an electric power-assisted steering apparatus including: a second shaft that is gear-coupled to a worm wheel by a worm disposed on an outer circumference of the second shaft and is connected to a first shaft driven by a motor through a power transfer member; a bearing coupled to an inside of a gear housing so as to support rotation of the second shaft; and a ring-shaped fixing member that is coupled to the second shaft and supported by one side of the bearing, and provides support between the second shaft and the bearing.

According to the present embodiments, a worm shaft is completely fixed in an axial direction to prevent the worm shaft from moving in the axial direction even when an axial load is applied to the worm shaft at the time of rotation of a worm wheel by a driving force of a motor, or such an axial load is repeated, or an impact, which occurs due to a full turn of the steering wheel, is transferred to the worm shaft, so that the reducer can prevent colliding between periphery components and vibration and noise caused by the colliding and prevent the worm shaft from escaping from an inner rotor, thereby stably transferring the driving force of the motor.

In addition, the reducer can reduce noise from a clearance between a first boss and a second boss in comparison with a conventional power transfer member, and can prevent noise caused by colliding and vibration occurring when power is transferred at a portion at which a worm shaft and a motor shaft are coupled to each other.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
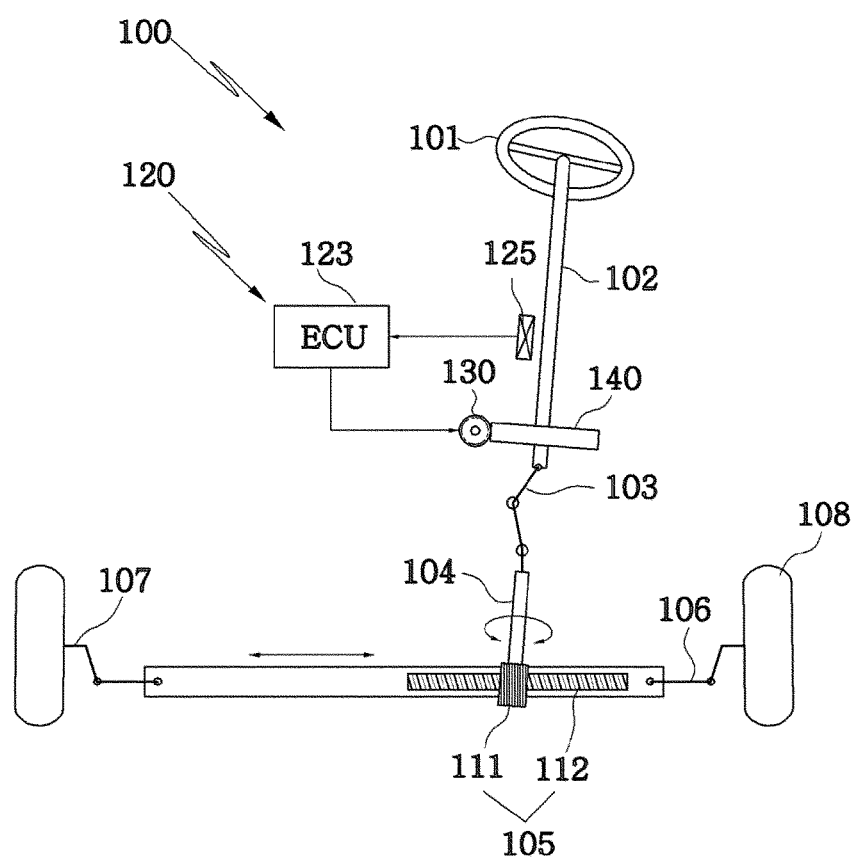
FIG. 1 is a diagram briefly illustrating an electric power-assisted steering apparatus according to the present embodiments.

Hereinafter, the present embodiments will be described in detail with reference to the accompanying drawings. In adding reference numerals to elements in each drawing, it should be noted that the same elements are designated by the same reference numerals, if possible, although they are shown in different drawings. Further, in the following description for the present embodiments, a detailed description of known functions and configurations incorporated herein will be omitted when it may make the subject matter of the present disclosure rather unclear.

In addition, terms, such as first, second, A, B, (a), (b) or the like may be used herein when describing elements of the present embodiments. These terms are merely used to distinguish one element from other elements, and a property, an order, a sequence and the like of a corresponding element are not limited by the term. It should be noted that if it is described in the specification that one element is "connected," "coupled," or "joined" to another element, a third element may be "connected," "coupled," and "joined" between the first and second elements, although the first element may be directly connected or joined to the second element.

Figure 2:
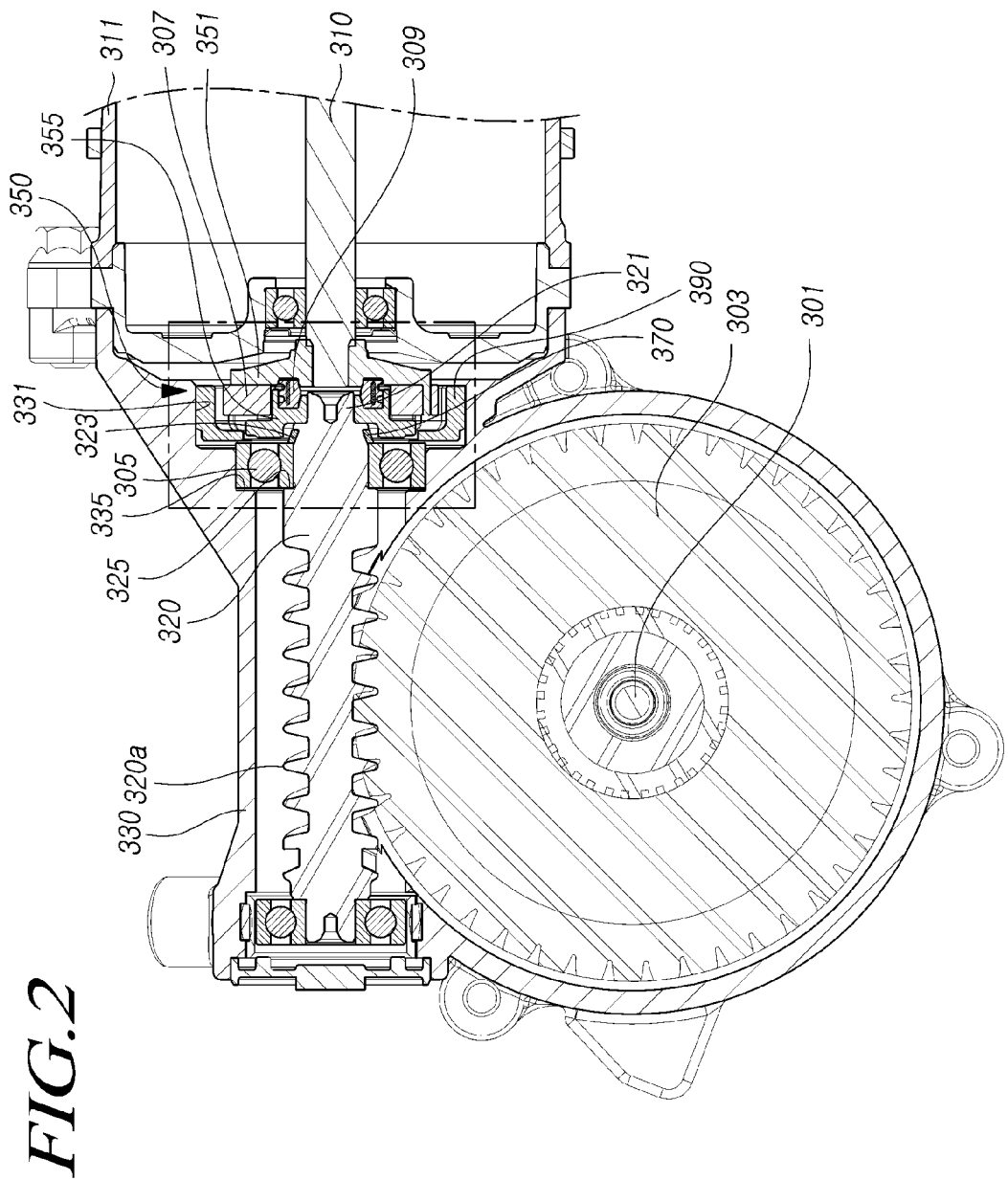
FIG. 2 is a cross-sectional view illustrating a reducer of an electric power-assisted steering apparatus according to the present embodiments.
Figure 3:
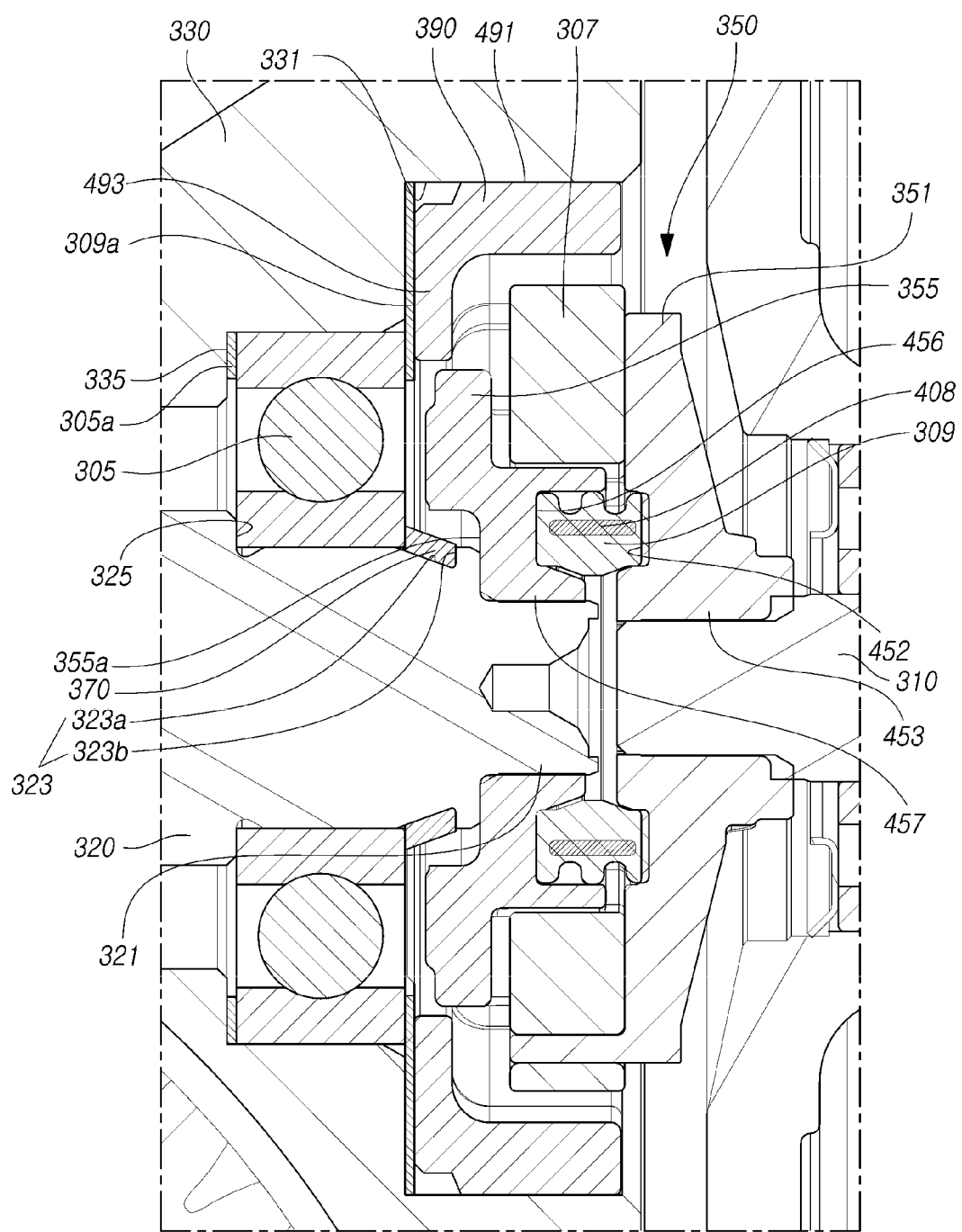
FIG. 3 is an enlarged view of FIG. 2.
Figure 4:
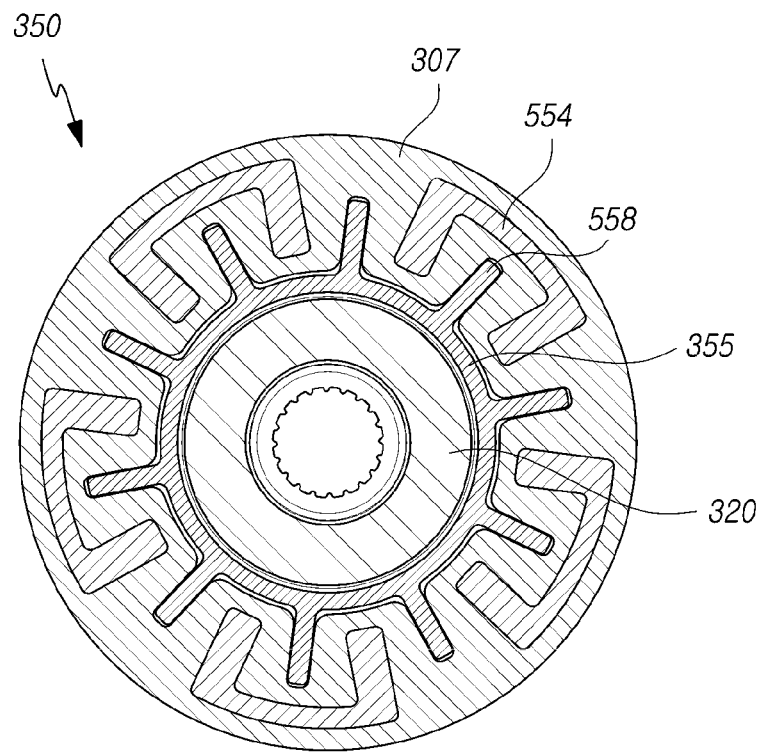
FIG. 4 is a cross-sectional view of a power transfer member of a reducer of an electric power-assisted steering apparatus according to the present embodiments.
Figure 5:
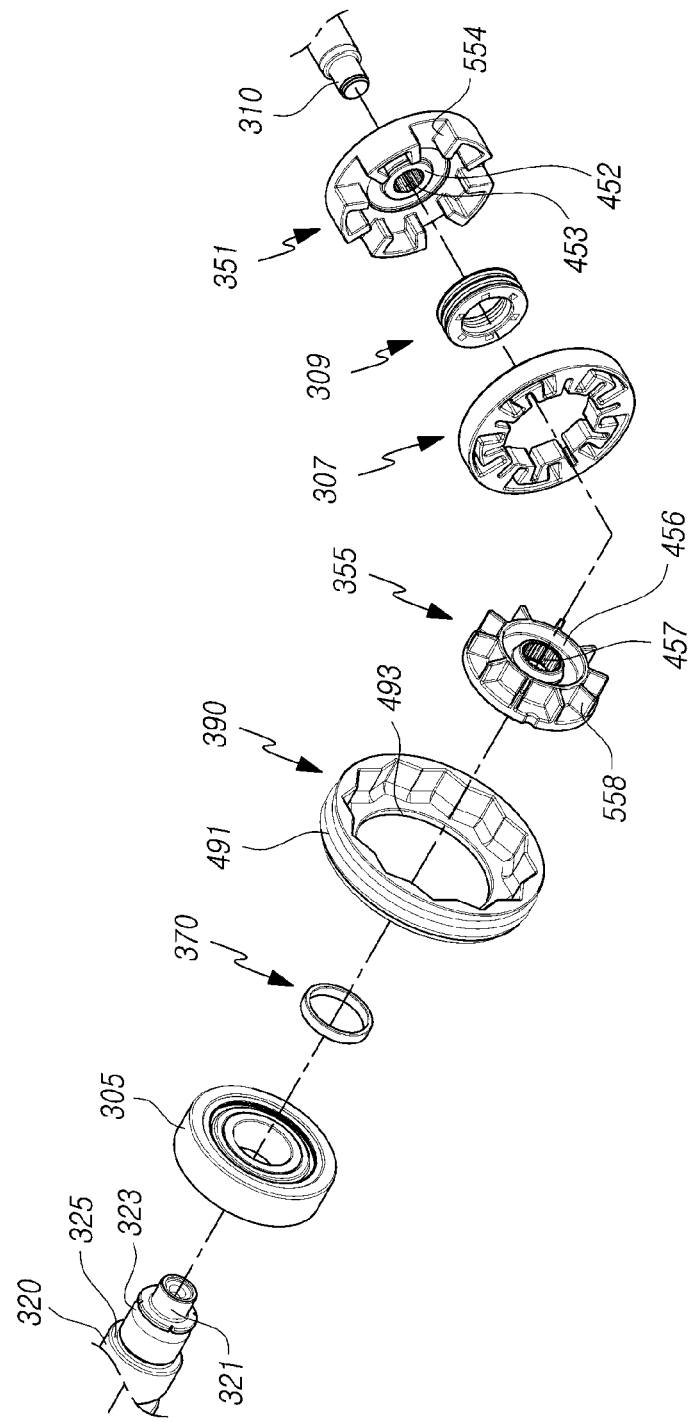
FIG. 5 is an exploded perspective view of a part of a reducer of an electric power-assisted steering apparatus according to the present embodiments.

FIG. 1 is a diagram briefly illustrating an electric power-assisted steering apparatus according to the present embodiments, FIG. 2 is a cross-sectional view illustrating a reducer of an electric power-assisted steering apparatus according to the present embodiments, FIG. 3 is an enlarged view of FIG. 2, FIG. 4 is a cross-sectional view of a power transfer member of a reducer of an electric power-assisted steering apparatus according to the present embodiments, FIG. 5 is an exploded perspective view of a part of a reducer of an electric power-assisted steering apparatus according to the present embodiments, and FIGS. 6 to 9 are cross-sectional views of a reducer of an electric power-assisted steering apparatus according to the present embodiments.

As illustrated in the above drawings, an electric power-assisted steering apparatus according to the present embodiments includes: a steering system 100 ranging from a steering wheel 101 to opposite wheels 108; and an auxiliary power mechanism 120 that provides auxiliary steering power to the steering system 100.

The steering system 100 includes a steering shaft 102, one side of which is connected to the steering wheel 101 and is rotated together with the steering wheel 101, and the other side of which is connected to a pinion shaft 104 through a pair of universal joints 103. The pinion shaft 104 is connected to a rack bar through a rack-pinion mechanism 105, and opposite ends of the rack bar are connected to the wheels 108 of a vehicle through tie rods 106 and knuckle arms 107. The rack-pinion mechanism 105 includes a pinion gear 111 disposed on the pinion shaft 104 and a rack gear 112 disposed on one side of an outer circumferential surface of the rack bar, and the pinion gear 111 and the rack gear 112 are engaged with each other. Therefore, when a driver controls the steering wheel 101, torque is generated in the steering system 100 and the wheels 108 are steered by the torque through the rack-pinion mechanism 105 and the tie rods 106.

The auxiliary power mechanism 120 includes: a torque sensor 125 that senses torque applied to the steering wheel 101 by a driver and outputs an electrical signal proportional to the sensed torque; an electronic controller (an electronic control unit) 123 that generates a control signal on the basis of an electrical signal transferred from the torque sensor; a motor 130 that generates auxiliary power on the basis of a signal transferred from the electronic controller; and a reducer 140 that transfers auxiliary power generated in the motor to the steering shaft 102.

The reducer of the electric power-assisted steering apparatus according to the present embodiment includes: a second shaft 320 that is gear-coupled to a worm wheel 303 by a worm 320a disposed on an outer circumference of the second shaft 320 and is connected to a first shaft 310 driven by a motor 311 through a power transfer member 350; a bearing 305 coupled to an inside of a gear housing 330 so as to support rotation of the second shaft 320; and a ring-shaped fixing member 370 that is coupled to the second shaft 320 and supported by one side of the bearing 305, and supports between the second shaft 320 and the bearing 305.

The power transfer member 350 is coaxially connected to the first shaft 310 that is connected to and rotated by means of a power source, such as the motor 311, a pump, etc., and thus transfers a rotational force to the second shaft 320 from the power source. In the detailed description of the present disclosure, an electric power-assisted steering apparatus including a motor shaft, as the first shaft 310, and a worm shaft, as the second shaft 320, will be explained as an example.

The power transfer member 350 connects the second shaft 320 and the first shaft 310 generating auxiliary power of the electric power-assisted steering apparatus, thereby transferring auxiliary power generated in the motor 311 to a steering shaft 301 coupled to the worm wheel 303. Therefore, the power transfer member 350 is used as a power connector assisting a steering force of a driver.

The second shaft 320 has the worm 320a disposed thereon and is thus gear-coupled to the worm wheel 303. Therefore, a clearance compensation structure supporting the second shaft 320 toward the worm wheel 303 is arranged at a side opposite to a portion at which the second shaft 320 is connected to the first shaft 310. When the second shaft 320 is engaged with the worm wheel 303 to transfer power, the clearance compensation structure is moved toward the worm wheel 303 or in an axial direction.

The second shaft 320 and the worm wheel 303 are arranged in the gear housing 330. The second shaft 320 is rotatably supported in the gear housing 330 through the bearing 305 coupled to the gear housing 330. The worm wheel 303 is gear-coupled to the second shaft 320 and coupled to the steering shaft 301.

Bearings 305 are disposed at opposite ends of the second shaft 320 and supports rotation of the second shaft 320. For convenience of explanation, among the bearings, only one bearing 305 coupled to an end of the second shaft 320 connected to the first shaft 310 will be discussed.

When the second shaft 320 rotates the worm wheel 303 using a driving force of the motor 311, an axial load is applied to the second shaft 320. When the worm wheel 303 is rotated up to a restricted rotation angle during the continuous application of the axial load, an impact load generated by the collision of the end of the rack bar is transferred to the steering shaft 301 and the worm wheel 303, whereby the second shaft 320 is momentarily moved in an axial direction and may then escape from the power transfer member 350.

The worm wheel 303 rotates together with the steering wheel 301 and the steering shaft 301 is connected to the steering wheel and gear-engaged with the rack bar. In this structure, when a driver rotates the steering wheel up to the end, the rack bar moves up to the end. In this regard, the rotation angle of the worm wheel 303 is limited, and the restricted rotation angle of the worm wheel 303 as described above implies this limited angle.

In order to prevent the second shaft 320 from moving in an axial direction due to an impact generated by a full turn of the steering wheel and then escaping from the power transfer member 350, the second shaft 320 is fixed to the bearing 305 coupled to the gear housing 330 and the fixing member 370 providing support between the second shaft 320 and the bearing 305 is disposed.

The fixing member 370 has a ring shape and is coupled to an end portion of the second shaft 320 through press fitting to support one side surface of an inner ring of the bearing 305.

An inner circumferential surface of the fixing member 370 is press fit to the second shaft 320, and is located to be in contact with one side surface of the inner ring of the bearing 305, whereby the fixing member 370 fixes between the bearing 305 and the second shaft 320.

The fixing member 370 is coupled to the second shaft 320 and then one side of the fixing member 370 is caulked, whereby the fixing member 370 and the second shaft 320 may be fixed to each other. Also, the other side of the fixing member 370 supports one side of the inner ring of the bearing 305. Therefore, even when an axial load is applied to the second shaft 320, the second shaft 320 is fixed in the axial direction and is prevented from escaping from the power transfer member 350.

The second shaft 320 has an inclined groove 323 depressed in an outer circumferential surface thereof. When the fixing member 370 is caulked and then inserted into the inclined groove 323, one side of the fixing member 370 is supported by the inclined groove 323 and the other side thereof is supported by one side of the inner ring of the bearing 305 so as to prevent the second shaft 320 from moving in the axial direction.

The fixing member 370 is coupled to the second shaft 320 and supports one side of the inner ring of the bearing 305. When the fixing member 370 is coupled to the second shaft 320 and then is compressed by means of an inclined caulking tool, the fixing member 370 is inserted into the inclined groove 323 and the shape of the fixing member 370 is changed such that a diameter of the fixing member 370 becomes smaller toward one side thereof.

When an external force is applied using an inclined caulking tool from the outside of the fixing member 370, a space into which the fixing member 370 is deformed and then inserted corresponds to the inclined groove 323. Therefore, the shape of the fixing member 370 is changed into a shape corresponding to the inclined groove 323 and the fixing member 370 is compressed between one side of the inner ring of the bearing 305 and the inclined groove 323.

The inclined groove 323 includes: an inclined surface 323a allowing the depth of the groove to increase toward the end portion of the second shaft 320; and a stepped support surface 323b at which the groove is depressed up to a predetermined depth and is then stepped from the second shaft 320.

The stepped support surface 323b faces one side surface of the inner ring of the bearing 305. The fixing member 370 coupled to the second shaft 320 and then caulked is in close contact with the inclined surface 323a. Therefore, one side of the fixing member 370 is supported by the stepped support surface 323b and the other side thereof is supported by one side of the inner ring of the bearing 305, thereby preventing an axial movement between the second shaft 320 and the bearing 305.

The other side of the inner ring of the bearing 305 is supported by a second stepped portion 325 of the second shaft 320, and the second stepped portion 325 is stepped in and protrudes from the outer circumferential surface of the second shaft 320.

That is, the other side of the inner ring of the bearing 305 is supported by a second stepped portion 325 of the second shaft 320, and one side thereof is fixed to the second shaft 320 by the fixing member 370, whereby the bearing 305 and the second shaft 320 are completely fixed to each other in the axial direction.

An outer ring of the bearing 305 is fixed between a plug 390 coupled to the gear housing 330 and a first stepped portion 335 disposed in the gear housing 330.

The gear housing 330 includes an enlarged diameter portion 331, which is stepped, has an enlarged diameter, and is disposed on an inner circumferential surface of the gear housing 330. The plug 390 is screw-coupled to the enlarged diameter portion 331 so as to support and fix one side of the outer ring of the bearing 305.

The plug 390 includes a screw portion 491 which is disposed on an outer circumferential surface thereof and is screw-coupled to the enlarged diameter portion 331. The plug 390 includes a protruding support portion 493 protruding from an inside thereof to support one side of the outer ring of the bearing 305. An elastic support member 390a, such as a flat spring, a washer, or the like, may be disposed between one side of the outer ring of the bearing 305 and the plug 390.

The gear housing 330 includes the first stepped portion 335 stepped in and protruding from the inner circumferential surface thereof to support the other side of the outer ring of the bearing 305.

That is, the bearing 305 is inserted in the gear housing 330 while the other side of the outer ring of the bearing 305 is supported by the first stepped portion 335, and the plug 390 supporting one side of the outer ring of the bearing 305 is screw-coupled to the gear housing 330. Therefore, the bearing 305 and the gear housing 330 can be completely fixed to each other in the axial direction.

Also, an elastic support member 305a, such as a flat spring, a washer, or the like, is disposed between the other side of the outer ring of the bearing 305 and first stepped portion 335. Therefore, when a load is transferred to the second shaft 320 at a predetermined angle with respect to the axial direction, the second shaft 320 and the bearing 305 can be elastically supported between the gear housing 330 and the plug 390.

The bearing 305 is fixed to the gear housing 330, and the second shaft 320 is fixed to the bearing 305. Therefore, even when an axial load is applied to the second shaft 320, the second shaft 320 cannot be moved in the axial direction and the second shaft 320 and the power transfer member 350 are prevented from being separated from each other.

The embodiments of the fixing member 370 that fixes the second shaft 320 to the bearing 305 will be described with reference to FIGS. 6 to 8.

Figure 6:
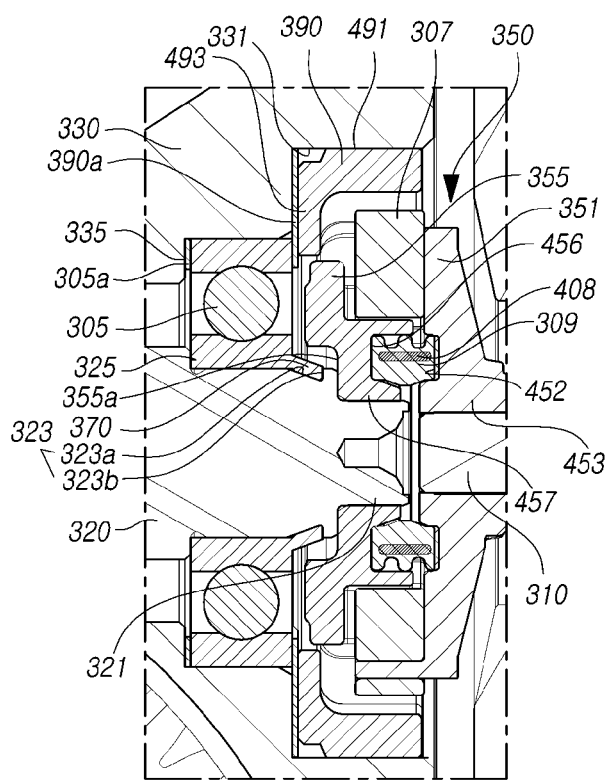
FIGS. 6 to 9 are cross-sectional views of a reducer of an electric power-assisted steering apparatus according to the present embodiments.

First, referring to FIG. 6, the fixing member 370 may be integrated with the inner ring of the bearing 305, and when the second shaft 320 is inserted in the bearing 305, the fixing member 370 is caulked to be compressed onto the inclined groove 323.

That is, the fixing member 370 protrudes from one side surface of the inner ring of the bearing 305 in the axial direction, and when a protruding end of the fixing member 370 is compressed to be stably placed in the inclined groove 323, the protruding end of the fixing member 370 is supported by the stepped support surface 323b to prevent the second shaft 320 from moving in the axial direction.

Figure 7:
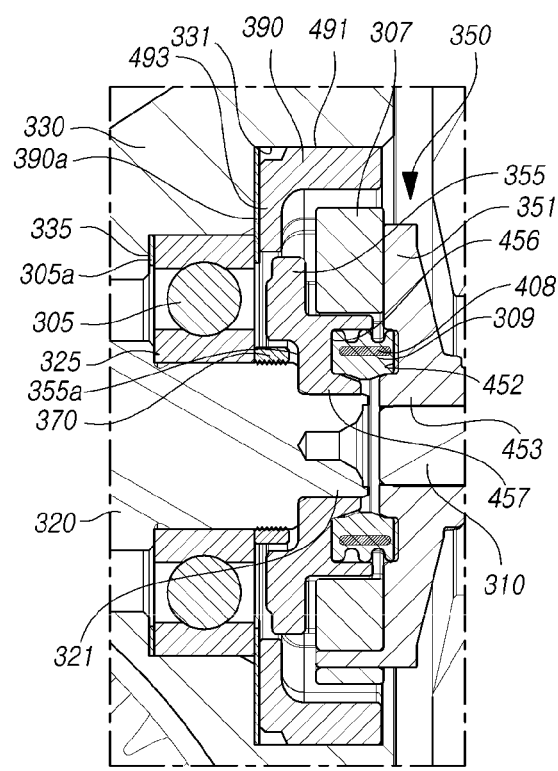

Referring to FIG. 7, the fixing member 370 may be screw-coupled to the second shaft 320 to support the bearing 305.

The fixing member 370 is screw-coupled to the second shaft 320 to prevent the slip between the fixing member 370 and the second shaft 320. The fixing member 370 supports one side of the inner ring of the bearing 305 to prevent the second shaft 320 from moving in the axial direction.

Figure 8:
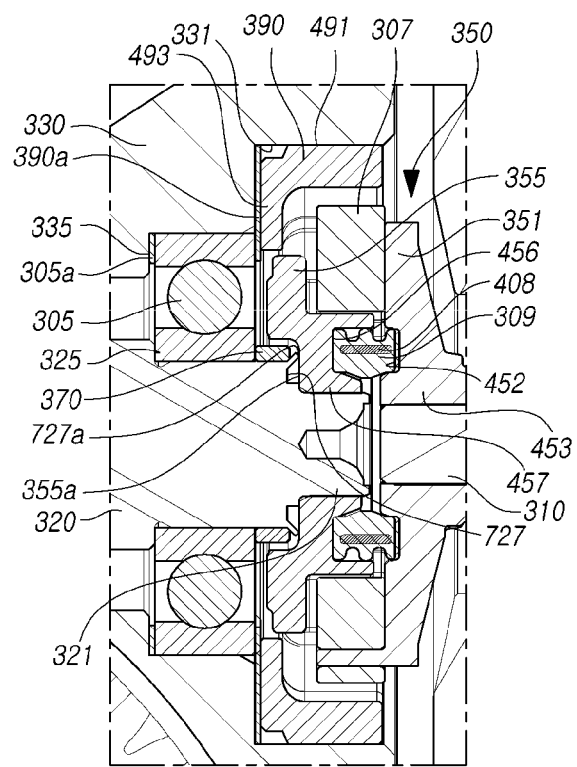

Referring to FIG. 8, the fixing member 370 is coupled to the second shaft 320 to support the bearing 305, and the second shaft 320 is caulked to fix the fixing member 370.

That is, when the fixing member 370 is coupled to the second shaft 320, and then a stepped surface between an extending portion 321 and an end portion of the second shaft 320 is caulked to protrude outward in a radial direction, a portion 727a protruding outward in a radial direction prevents the fixing member 370 from moving in the axial direction.

Also, a groove 727 is depressed in the shape of a recess on the stepped surface between the extending portion 321 and the end portion of the second shaft 320, such that the second shaft 320 is caulked and then easily protrudes outward in the radial direction. A caulking tool is inserted in the groove 727 thereby allowing a part or a circumference of the second shaft 320 to easily protrude outward in the radial direction.

The portion 727a protruding outward in the radial direction of the second shaft 320 supports the fixing member 370, the fixing member 370 supports the bearing 305, and the bearing 305 is supported by the second stepped portion 325 of the second shaft 320. Therefore, the second shaft 320 is prevented from moving in the axial direction.

The power transfer member 350 generally includes: a first boss 351; a second boss 355; and a radial damper 307 so as to coaxially connect the first shaft 310 and the second shaft 320 and transfer power.

The first boss 351 includes: a first coupling portion 453 coupled to the first shaft 310, and the first coupling portion 453 has an axial serration, which is disposed on an inner circumferential surface thereof and is coupled to the first shaft 310; and a rib-shaped first protrusion portion 554 protruding in the axial direction.

The second boss 355 includes: a second coupling portion 457 coupled to the extending portion 321 stepped in and extending from the end portion of the second shaft 320, and the second coupling portion 457 has an axial serration, which is disposed on an inner circumferential surface thereof and is coupled to the second shaft 320; and a rib-shaped second protrusion portion 558 protruding in the axial direction.

The first coupling portion 453 and the second coupling portion 457 have axial serrations, respectively, which are coupled to the first shaft 310 and the second shaft 320, and thus a slip is prevented.

The first protrusion portion 554 and the second protrusion portion 558 are inserted into the radial damper 307, and is thus elastically deformed in the radial direction.

The radial damper 307 prevents direct contact between the first protrusion portion 554 and the second protrusion portion 558 and thus they are in indirect contact with each other and are coupled through the radial damper 307. Therefore, the radial damper 307 absorbs noise due to a contact or an impact.

In addition, when the first shaft 310 and the first boss 351 are rotated by driving of the motor 311, the second shaft 320 and the second boss 355 are rotated through the radial damper 307. Accordingly, the first shaft 310 and the first boss 351 momentarily have a predetermined difference in rotation angle from the second shaft 320 and the second boss 355, and thus relatively move in comparison with the second shaft 320 and the second boss 355.

The momentary relative movements of the first shaft 310 and the second shaft 320 may generate friction when the first shaft 310 and the second shaft 320 are in contact with each other in the axial direction, and friction may be also generated when the first boss 351 and the second boss 355 are in contact with each other in the axial direction. Therefore, the first shaft 310 and the second shaft 320 are spaced from each other in the axial direction, the first boss 351 and the second boss 355 are also spaced from each other in the axial direction, and an axial damper 309 is disposed between the first boss 351 and the second boss 355.

The axial damper 309 is supported between a first seating portion 452 disposed in the first boss 351 and a second seating portion 456 disposed in the second boss 355.

The axial damper 309 elastically supports the first boss 351 and the second boss 355 so as to maintain the first shaft 310 and the second shaft 320, and the first boss 351 and the second boss 355 to be spaced from each other, and transfers a driving force of the motor 311 from the first shaft 310 and the first boss 351 to the second shaft 320 and the second boss 355.

A hollow-shaped rigidity member 408 is embedded in the axial damper 309 to supplement the rigidity of the axial damper 309 providing support between the first shaft 310 and the second shaft 320 and between the first boss 351 and the second boss 355 to maintain the space therebetween.

The rigidity member 408 has a hollow shape, is embedded in the axial damper 309, and reduces an amount of deformation of the axial damper 309.

The radial damper 307 and the axial damper 309 as described above can remove noise due to a clearance between the first boss 351 and the second boss 355 and prevent collision or friction from occurring when power is transferred at a portion at which the first shaft 310 and the second shaft 320 are coupled.

The second boss 355 includes a receiving groove 355a which is depressed in a surface facing the bearing 305 and the second boss 355 is serration-coupled to the extending portion 321. Therefore, the receiving groove 355a is in contact with a stepped surface between the second shaft 320 and the extending portion 321 and the fixing member 370 is located in the receiving groove 355a.

The receiving groove 355a includes the fixing member 370 coupled to the second shaft 320 to prevent an axial length of the second shaft 320 from being long, and allows a serration coupling portion between the second coupling portion 457 of the second boss 355 and the extending portion 321 to be widened.

Figure 9:
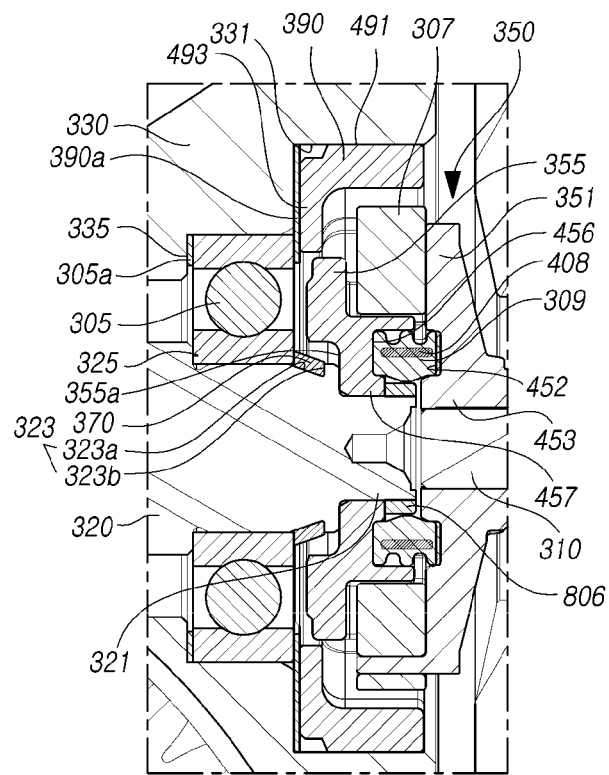

As illustrated in FIG. 9, in order to prevent the second shaft 320 from escaping from the second boss 355 due to application of an axial load to the second shaft 320, a hollow-shaped auxiliary fixing member 806 is coupled to an end portion of the extending portion 321.

The auxiliary fixing member 806 is screw-coupled to the end portion of the extending portion 321, to support the second boss 355, and the second boss 355 is located and fixed between a stepped surface between the extending portion 321 and the end portion of the second shaft 320 and the auxiliary fixing member 806.

Accordingly, even when an axial load is applied to the second shaft 320, the axial movement of the second shaft 320 is fixed and the second shaft 320 is prevented from escaping from the second boss 355 as long as the second shaft 320 or the second boss 355 is not deformed or the coupling of the auxiliary fixing member 806 is not released.

According to the present embodiments having the shapes and the structures as described above, a worm shaft is completely fixed in an axial direction thereby preventing the worm shaft from moving in the axial direction even when: an axial load is applied to the worm shaft when a conventional worm shaft rotates a worm wheel by a driving force of a motor; the axial load is repeated; or an impact caused by a full turn of the steering wheel is transferred to the worm shaft, and accordingly, colliding with periphery components, vibration, and noise are prevented and the worm shaft is prevented from escaping from the power transfer member, whereby a driving force of the motor can be stably transferred.

In addition, the reducer can reduce noise from a clearance between a first boss and a second boss in comparison with a conventional power transfer member, and can prevent noise caused by colliding and vibration occurring when power is transferred at a portion at which a worm shaft and a motor shaft are coupled to each other.

Although all the elements constituting the present embodiments have been described above as being combined into a single unit or combined to be operated as a single unit, the present embodiments are not necessarily limited to such embodiments. That is, at least two elements of all elements may be selectively joined and operate without departing from the scope of the present embodiments.

The above description has been made merely for the purpose of illustrating the technical idea of the present embodiments, and those skilled in the art will appreciate that various modifications and changes are possible without departing from the scope and spirit of the present embodiments. Therefore, the present embodiments are not intended to limit, but to illustrate the technical idea of the present embodiments, and the scope of the technical idea of the present embodiments are not limited by the embodiments. The scope of the present embodiments shall be construed on the basis of the accompanying claims in such a manner that all of the technical ideas included within the scope equivalent to the claims belong to the present disclosure.

What is claimed is:

1. A reducer of an electric power-assisted steering apparatus comprising:
   a second shaft that is gear-coupled to a worm wheel by a worm disposed on an outer circumference of the second shaft and is connected to a first shaft driven by a motor through a power transfer member;
   a bearing coupled to an inside of a gear housing so as to support rotation of the second shaft; and
   a ring-shaped fixing member that is coupled to the second shaft and supported by a first side of an inner ring of the bearing, and provides support between the second shaft and the bearing,
   wherein the power transfer member comprises a first boss coupled to the first shaft and a second boss coupled to the second shaft,
   wherein an axial damper disposed between the first boss and the second boss to elastically support the first boss and the second boss,
   wherein the reducer further comprises a radial damper configured to elastically deform in a radial direction and disposed between the first boss and the second boss,
   wherein the radial damper is spaced apart from the axial damper,
   wherein the radial damper comprises one or more holes, and the first boss comprises a first protrusion portion disposed in one of the one or more holes of the radial damper, and
   wherein the inner surface of the radial damper has one or more grooves, and the second boss comprises a second protrusion portion protruding in a radial direction and disposed in the one or more grooves formed on the inner surface of the radial damper, and
   wherein the first protrusion portion of the first boss disposed in the one of the one or more holes of the radial damper has a curved part forming an inner space therein, and at least a part of the second protrusion portion of the second boss is disposed within the inner space of the curved part of the first protrusion portion of the first boss.

2. The reducer of claim 1, wherein:
   the first protrusion portion of the first boss is rib-shaped and protrudes in an axial direction;
   the second boss is coupled to an extending portion stepped in and extending from an end portion of the second shaft and the second protrusion portion of the second boss is rib-shaped and protrudes in the axial direction; and
   the first protrusion portion and the second protrusion portion are inserted into the radial damper, and the radial damper is elastically deformed in the radial direction.

3. The reducer of claim 2, wherein the first shaft and the second shaft are spaced from each other in the axial direction, the first boss and the second boss are spaced from each other in the axial direction.

4. The reducer of claim 2, wherein the second boss comprises a receiving groove which is depressed in a surface of the second boss facing the bearing and the fixing member is located in the receiving groove.

5. The reducer of claim 4, wherein the gear housing comprises: an enlarged diameter portion, which is stepped, has an enlarged diameter, and is disposed on an inner circumferential surface of the gear housing; and a plug is screw-coupled to the enlarged diameter portion so as to support and fix one side of an outer ring of the bearing.

6. The reducer of claim 5, wherein an elastic support member is disposed between a first side of the outer ring of the bearing and the plug.

7. The reducer of claim 5, wherein the gear housing comprises a first stepped portion stepped in and protruding from the inner circumferential surface thereof to support a second side of the outer ring of the bearing.

8. The reducer of claim 7, wherein an elastic support member is disposed between the second side of the outer ring of the bearing and the first stepped portion of the gear housing.

9. The reducer of claim 7, wherein the second shaft comprises a second stepped portion stepped in and protruding from an outer circumferential surface thereof to support a second side of the inner ring of the bearing.

10. The reducer of claim 9, wherein the second shaft comprises an inclined groove depressed in the outer circumferential surface thereof, and the fixing member is inserted in and fixed to the inclined groove.

11. The reducer of claim 10, wherein the inclined groove comprises a stepped support surface facing one side surface of the inner ring of the bearing, a first side of the fixing member supports the stepped support surface, and a second side of the fixing member supports the bearing thereby fixing the bearing.

12. The reducer of claim 10, wherein the fixing member is integrated with the inner ring of the bearing.

13. The reducer of claim 10, wherein the fixing member is screw-coupled to the second shaft.

14. The reducer of claim 10, wherein a hollow-shaped auxiliary fixing member fixing the second boss is coupled to an end portion of the extending portion.

15. The reducer of claim 1, wherein one or more grooves are formed on an outer circumferential surface of the axial damper disposed between the first boss and the second boss.

16. The reducer of claim 1, wherein the axial damper is disposed between grooves formed on each of the first and second bosses.

17. The reducer of claim 1, wherein the axial damper disposed between the first boss and the second boss has a hole.

18. The reducer of claim 1, wherein the first protrusion portion of the first boss having one or more parts protruding toward the second boss, and the one or more parts of the second protrusion portion protruding in the radial direction protrudes toward the first boss.

19. The reducer of claim 1, wherein the axial damper comprises an outer portion elastically supporting the first boss and the second boss and an inner portion supplementing a rigidity of the outer portion of the axial damper and disposed in the outer portion of the axial damper.

20. A reducer of an electric power-assisted steering apparatus comprising:
a second shaft that is gear-coupled to a worm wheel by a worm disposed on an outer circumference of the second shaft and is connected to a first shaft driven by a motor through a power transfer member;
a bearing coupled to an inside of a gear housing so as to support rotation of the second shaft; and
a ring-shaped fixing member that is coupled to the second shaft and supported by a first side of an inner ring of the bearing, and provides support between the second shaft and the bearing,
wherein the power transfer member comprises a first boss coupled to the first shaft and a second boss coupled to the second shaft,
wherein an axial damper disposed between the first boss and the second boss to elastically support the first boss and the second boss,
wherein the reducer further comprises a radial damper configured to elastically deform in a radial direction and disposed between the first boss and the second boss,
wherein the radial damper is spaced apart from the axial damper, and
wherein the radial damper comprises one or more holes, and the first boss comprises a first protrusion portion disposed in one of the one or more holes of the radial damper, and
wherein the first protrusion portion of the first boss disposed in the one of the one or more holes of the radial damper has a curved part forming an inner space therein, and at least a part of a second protrusion portion of the second boss protruding toward the first protrusion portion of the first boss is disposed within the inner space of the curved part of the first protrusion portion of the first boss.

* * * * *